2,712,542

NEW SERIES OF 2-(3-PYRIDAZONYL)-ACIDS AND THEIR DERIVATIVES AND METHOD OF PREPARING MEMBERS OF THE SERIES

John A. King, Manhasset, and Freeman H. McMillan, New York, N. Y., assignors to Warner-Hudnut, Inc., New York, N. Y., a corporation of Delaware No Drawing. Application May 14, 1952,
Serial No. 287,802

10 Claims. (Cl. 260—250)

This invention relates to a new series of chemical compounds which have been found to be valuable pharmaceutical agents and to the preparation of members of that series. The series includes a number of closely related 2-(3-pyridazonyl)-acids and their derivatives, as well as certain 2-(3-pyridazonyl)-ketones which are obtained directly from those acids, and which are described by the general formula:

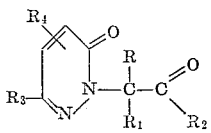

wherein

R represents a member of the group consisting of hydrogen, alkyl and aryl, preferably hydrogen and lower alkyl $R_1$ represents a member of the group consisting of hydrogen, alkyl and aryl, preferably hydrogen and lower alkyl $R_2$ represents a member of the group consisting of alkoxy, hydroxy, amido, alkylamido, dialkylamido, arylamido, diarylamido, alkyl, aryl and aralkyl $R_3$ represents a member of the group consisting of hydrogen, alkyl, aryl, carbalkoxy and carboxy, and $R_4$ represents a member of the group consisting of hydrogen, alkyl, aryl, carbalkoxy and carboxy.

We have also made the surprising discovery that those 2-(3-pyridazonyl)-acetic acids of our invention which have at least one hydrogen atom attached to the alpha carbon, may be converted to a ketone by means of an acid anhydride, in the presence of an organic base, in accordance with the following reaction scheme:

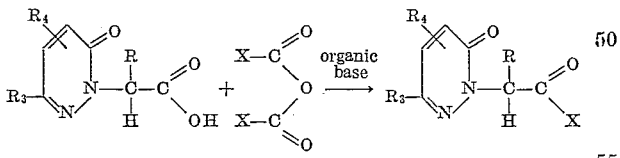

wherein R, $R_3$ and $R_4$ have the significance given above, and X represents a member of the group consisting of alkyl, aryl and aralkyl.

In carrying out the above reaction, we prefer to use an excess of the anhydride, i. e., more of the anhydride than the quantity which would be required theoretically to react with the quantity of acid used.

The preparation of various members of the new series of compounds is illustrated generally by the following reactions:

I. Preparation of esters by alkylation

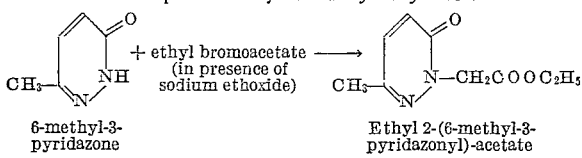

6-methyl-3-pyridazone   Ethyl 2-(6-methyl-3-pyridazonyl)-acetate

II. Preparation of acids by hydrolysis

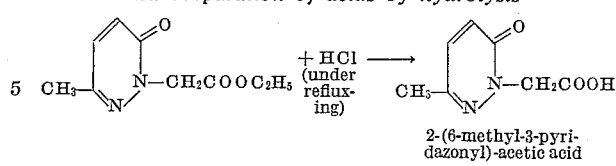

2-(6-methyl-3-pyridazonyl)-acetic acid

III. Preparation of amides by ammonolysis

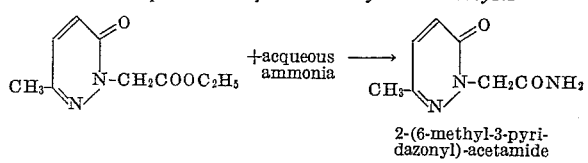

2-(6-methyl-3-pyridazonyl)-acetamide

IV. Preparation of amides by alkylation

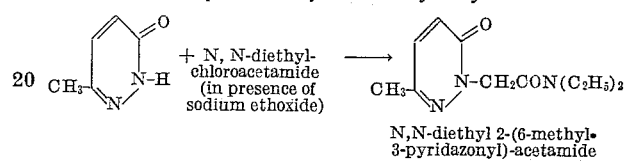

N,N-diethyl 2-(6-methyl-3-pyridazonyl)-acetamide

V. Preparation of ketones

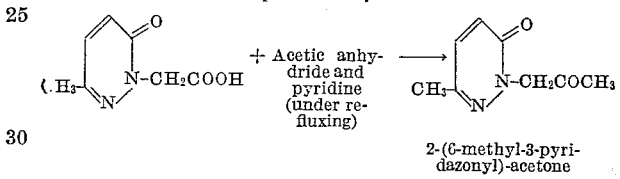

2-(6-methyl-3-pyridazonyl)-acetone or

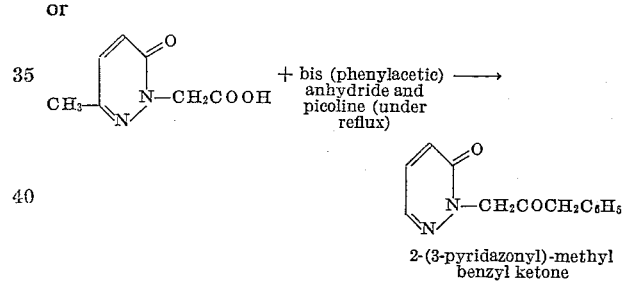

2-(3-pyridazonyl)-methyl benzyl ketone

VI. Preparation of anilides

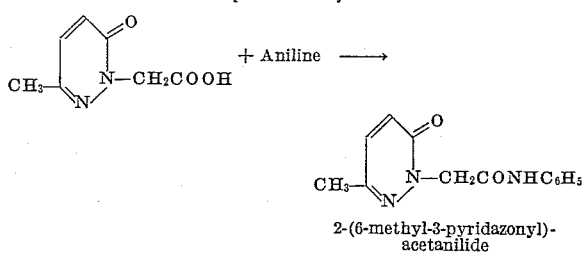

2-(6-methyl-3-pyridazonyl)-acetanilide

The foregoing illustrative reactions have been described with reference to 6-methyl-3-pyridazone as the starting compound. However, other starting compounds may be used wherein the methyl group in the 6-position in the 3-pyridazone structure is replaced by an alkyl group other than methyl, by hydrogen, or by an aryl, carboxy or carbalkoxy group.

For example, the methyl group in 6-methyl-3-pyridazone may be oxidized to a carboxyl group which group may be esterified to give ethyl 6-(3-pyridazonyl)-carboxylate as by the procedure set forth by R. F. Homer et al. in J. Chem. Soc. 2195 (1948). Then, the latter compound may be alkylated with ethyl bromoacetate to give the ester, ethyl 2-(6-carbethoxy-3-pyridazonyl)-acetate, which may be hydrolyzed to the corresponding acid 2-(6-carboxy-3-pyridazonyl)-acetic acid.

Likewise, the acid 6-(3-pyridazonyl)-carboxylic acid may be decarboxylated to produce 3-pyridazone which may be condensed with ethyl chloroacetate to give the ester, ethyl 2-(3-pyridazonyl)-acetate. This ester may be hydrolyzed to the acid 2-(3-pyridazonyl)-acetic acid which, in turn, may be treated with acetic anhydride and pyridine to produce the acetone derivative, 2-(3-pyridizonyl)-acetone.

The various members of the new series of compounds which we have invented differ from each other somewhat in degree of pharmaceutical utility. In general, however, the properties which they possess include improved analgesic, anticonvulsant, antispasmodic and sedative activities.

In order that our invention will be entirely available to those skilled in the art, methods of preparing a number of the members of our new series of compounds will be described briefly:

EXAMPLE I

*Ethyl 2-(6-methyl-3-pyridazonyl)-acetate*

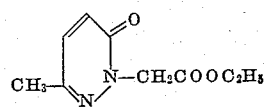

Sodium (23 g., 1.00 mole) was dissolved in absolute ethanol (450 cc.) contained in a 2-liter 3-necked flask fitted with a stirrer, dropping funnel, immersed thermometer and reflux condenser. The stirred sodium ethoxide solution was cooled to 10° C. and there was added 6-methyl-3-pyridazone (110 g., 1.00 mole) followed by the dropwise addition, while the reaction temperature was maintained at 15–20° C. of ethyl bromoacetate (167 g., 1.00 mole). After the addition was complete, the mixture was refluxed one hour, cooled, and filtered. The alcohol was removed from the filtrate under vacuum and the residue was taken up in benzene (500 cc.). A small additional amount of sodium bromide was removed by filtration and the benzene solution was then fractionally distilled to give 160 g. (82% yield) of product, B. P. 159–167° C. (5–6 mm.), which crystallized in the receiver. After recrystallization from benzene it melted at 77.5–79° C.

EXAMPLE II

*2-(6-methyl-3-pyridazonyl)-acetic acid*

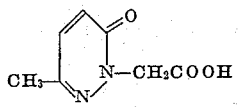

A mixture of ethyl 2-(6-methyl-3-pyridazonyl)-acetate (40 g., 0.2 mole) and 5% hydrochloric acid (200 cc.) was refluxed two hours, during which time the crystalline acid started separating. The mixture was chilled and filtered to give 30.6 g. (91% yield) of product, M. P. 237–240° C. (dec.).

Two hours refluxing with five times its weight of 10% sodium hydroxide solution, followed by acidification, gave an equally good yield of acid from the ester.

EXAMPLE III

*2-(6-methyl-3-pyridazonyl)-acetamide*

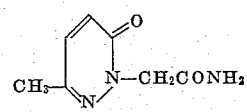

Sixteen g. (0.08 mole) of ethyl 2-(6-methyl-3-pyridazonyl)-acetate was added to concentrated (28%) aqueous ammonia (160 cc.) with swirling and the resultant solution was chilled in an ice bath for 30 minutes. The crystalline amide was removed by filtration and recrystallized from 80 cc. of water to give 9.5 g. (71% yield) of product, M. P. 224–225° C.

EXAMPLE IV

*N,N-diethyl-2-(6-methyl-3-pyridazonyl)-acetamide*

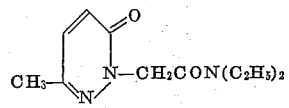

6-methyl-3-pyridazone (22.0 g., 0.2 mole) was added to a stirred solution of sodium (4.6 g., 0.2 mole) in ethanol (100 cc.), followed by the dropwise addition of N,N-diethyl chloroacetamide (30.0 g., 0.2 mole). The reaction mixture became turbid and its temperature gradually rose to 47° C. during the addition. The mixture was then refluxed for 15 hours and filtered hot. The filtrate was evaporated to dryness under vacuum and the residue was recrystallized from alcohol-ether to give 4.9 g. (11% yield) of product, M. P. 110.5–112° C. The filtrate from this crystalline material was fractionally distilled to give an additional 19.5 g. (44% yield; total, 24.4 g., 55% yield) of product, B. P. 160–164° C. (0.15 mm.) which crystallized in the distillation apparatus. The recrystallized material was analyzed.

EXAMPLE V

*2-(6-methyl-3-pyridazonyl)-acetanilide*

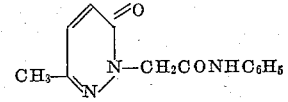

Ten g. (0.06 mole) of 2-(6-methyl-3-pyridazonyl)-acetic acid and 20 g. (0.22 mole) of aniline were heated to reflux (ca. 200° C.) under an air condenser for 2.5 hours. The resultant mixture, which crystallized on cooling, was recrystallized from alcohol (400 cc.) to give 12.4 g. (85% yield) of the anilide, M. P. 203–304° C.

EXAMPLE VI

*2-(6-methyl-3-pyridazonyl)-acetone*

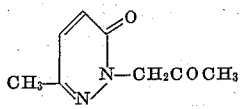

A mixture of 2-(6-methyl-3-pyridazonyl)-acetic acid (16.8 g., 0.10 mole), acetic anhydride (50 cc.) and pyridine (34 cc.) was refluxed for two hours, during which time there was copious evolution of carbon dioxide. The excess reagents were removed under vacuum to leave a gummy residue which soon solidified and was recrystallized from ethanol-Skellysolve B and from benzene. There was obtained a total of 9.6 g. (62% yield) of product which melted, after another recrystallization, at 99.5–100° C.

EXAMPLE VII

*Ethyl α-[2-(6-methyl-3-pyridazonyl)]-propionate*

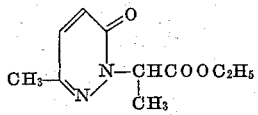

To a stirred solution of sodium (6.9 g., 0.3 mole) in ethanol (150 cc.) there was added 6-methyl-3-pyridazone (33 g., 0.3 mole) and then while the temperature of the stirred reaction mixture was held at 15–20° C. there was added, during ten minutes, ethyl α-bromopropionate (54.3 g., 0.3 mole). The mixture was then refluxed with stirring for 45 minutes, cooled, filtered and the filtrate taken to dryness under vacuum. The residue was partitioned between benzene (200 cc.) and water (100 cc.) and the benzene layer was fractionally distilled to give 41.4 g. (66% yield) of product, B. P. 97–101° C. (0.1–0.2 mm.), $n_D^{25}$ 1.5025, sp. gr.$_{25}^{25}$ 1.1423

EXAMPLE VIII

α-[2-(6-methyl-3-pyridazonyl)]-propionic acid

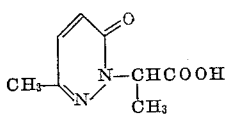

27 g. (0.129 mole) of the corresponding ethyl ester was refluxed for one hour with 130 cc. of 10% sodium hydroxide. The solution was acidified (hydrochloric acid), concentrated to incipient crystallization, and then chilled. Filtration furnished 23.1 g. (99% yield) of product, M. P. 141–142° C. after recrystallization from water.

EXAMPLE IX

Methyl 1-[2-(6-methyl-3-pyridazonyl)]-ethyl ketone

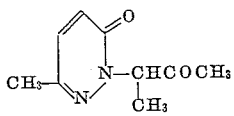

A mixture of α-[2-(6-methyl-3-pyridazonyl)]-propionic acid (12.0 g., 0.068 mole), acetic anhydride (60 cc.) and pyridine (40 cc.) was refluxed two hours, during which time carbon dioxide was freely evolved. The reaction mixture was fractionally distilled to give 9.4 g. (78% yield) of product, B. P. 94–99° C. (0.4 mm.), $n_D^{25}$ 1.5226.

EXAMPLE X

Ethyl α-methyl-α-[2-(6-methyl-3-pyridazonyl)]-propionate

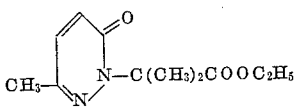

6-methyl-3-pyridazone (44.0 g., 0.40 mole) was added to a solution of sodium (10.0 g., 0.44 mole) in ethanol (400 cc.), followed by the addition of ethyl α-bromoisobutyrate (86.0 g., 0.44 mole). The mixture was refluxed with stirring for four hours, then cooled, diluted with three volumes of ether and filtered through supercel. The filtrate was taken to dryness under vacuum and the residue boiled with benzene; after filtration the benzene solution was fractionally distilled to give 16.5 g. (18% yield) of product, B. P. 105–114° C. (0.3 mm.).

EXAMPLE XI

α-Methyl-α-[2-(6-methyl-3-pyridazonyl)]-propionic acid

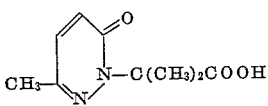

The corresponding ethyl ester was hydrolyzed, in 36% yield, to the acid by 3 hours' refluxing with 10% hydrochloric acid. The acid, after recrystallization from alcohol, melted at 214–214.5° C.

EXAMPLE XII

Ethyl 2-(6-carbethoxy-3-pyridazonyl)-acetate

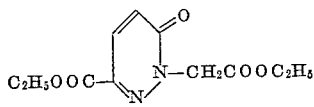

To a stirred mixture of ethyl 6-(3-pyridazonyl)-carboxylate (8.4 g., 0.05 mole) and ethyl bromoacetate (8.4 g., 0.05 mole) and ethanol (100 cc.) there was added during fifteen minutes, while the temperature of the reaction mixture was maintained at 15–20° C., an alcoholic solution of sodium ethoxide (prepared from 1.2 g. sodium in 50 cc. of absolute alcohol). The resultant white precipitate dissolved when the mixture was heated to reflux, at which temperature it was held for one hour. The mixture was then cooled and filtered and the filtrate was taken to dryness under vacuum to leave a white residue which after recrystallization from aqueous alcohol weighed 7.8 g. (61% yield) and melted at 82–83° C.

EXAMPLE XIII 2-(6-carboxy-3-pyridazonyl)-acetic acid

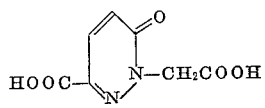

The diester of Example XII (3.4 g., 0.013 mole) was refluxed twenty hours with 25 cc. of 1:1 hydrochloric acid and the solution was then taken to dryness under vacuum. Recrystallization of the residue from water gave 1.4 g. of product, M. P. 220–223° C.

EXAMPLE XIV

Ethyl 2-(3-pyridazonyl)acetate

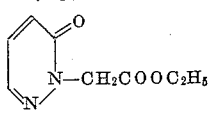

To a solution of 3-pyridazone, (M. P. 100–103° C.), prepared in 82% yield by thermal decarboxylation at 275° of 6-carboxy-3-pyridazone (27.4 g., 0.29 mole) in alcoholic sodium ethoxide (prepared by dissolving 6.6 g. sodium in 285 cc. absolute alcohol) there was added dropwise ethyl chloroacetate (35 g., 0.29 mole) while the reaction mixture was refluxed one hour and then filtered. The filtrate was taken to dryness under vacuum and the residue was distilled to give 33.4 g. (64% yield) of product, B. P. 109–117° C. (0.35–0.9 mm.), which crystallized in the receiver. After recrystallization from Skellysolve B plus a little benzene the material melted at 52.5–53° C.

EXAMPLE XV 2-(3-pyridazonyl)-acetic acid

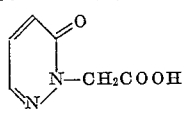

This compound was prepared, in 66% yield, by one hour's hydrolysis with 1:1 hydrochloric acid of the corresponding ethyl ester. After recrystallization from water the acid melted at 174–175° C.

EXAMPLE XVI 2-(3-pyridazonyl)-acetone

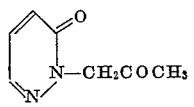

A mixture of 2-(3-pyridazonyl)-acetic acid (15.3 g., 0.10 mole), acetic anhydride (100 cc.) and pyridine (100 cc.) was refluxed two hours and then taken to dryness under vacuum. The residue was partitioned between benzene and 10% aqueous potassium carbonate solution, the benzene layer was separated and evaporated to leave 3.4 g. (22% yield) of ketone which after sublimation at 0.15 mm. (bath at 100°) followed by recrystallization from Skellysolve B-benzene melted at 98–99° C.

It will be appreciated that the carboxy group in the compounds of the present invention may be present in the form of the metal salt thereof and it is intended that the term "carboxy" as used herein includes the metal salts thereof. Thus, in Example II, it will be noted that acid of the present invention is refluxed with sodium hydroxide to give the sodium salt of the acid.

What is claimed is:

1. A new chemical compound of the formula:

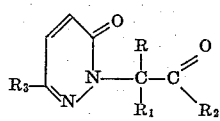

wherein

R represents a member of the group consisting of hydrogen and lower alkyl

R₁ represents a member of the group consisting of hydrogen and lower alkyl

R₂ represents a member of the group consisting of lower alkoxy, hydroxy, amino, lower monoalkylamino, lower dialkylamino, anilino and lower alkyl R₃ represents a member of the group consisting of hydrogen, lower alkyl, lower carbalkoxy and carboxy.

2. 2-(6-methyl-3-pyridazonyl)-acetone represented by the formula:

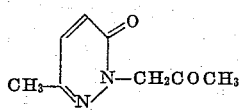

3. α-[2-(6-methyl-3-pyridazonyl)]-propionic acid represented by the formula:

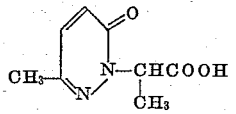

4. Methyl 1-[2-(6-methyl-3-pyridazonyl)]-ethyl ketone represented by the formula:

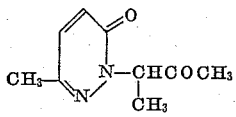

5. 2-(6-carboxy-3-pyridazonyl)-acetic acid represented by the formula:

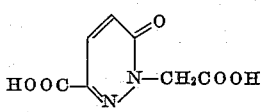

6. 2-(3-pyridazonyl)-acetone represented by the formula:

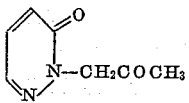

7. The method of preparing a 2-(3-pyridazonyl)-ketone represented by the formula:

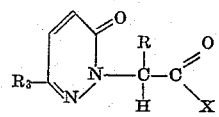

wherein

R represents a member of the group consisting of hydrogen and lower alkyl

R₃ represents a member of the group consisting of hydrogen, lower alkyl, lower carbalkoxy and carboxy, and X represents lower alkyl, which comprises causing a 2-(3-pyridazonyl)-acetic acid represented by the formula:

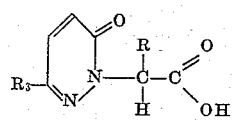

wherein R and R₃ have the significance given above, to react with an acid anhydride represented by the formula:

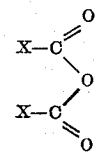

wherein X has the significance given above, by refluxing said materials in the presence of an organic base.

8. The method of preparing 2-(6-methyl-3-pyridazonyl)-acetone, which comprises causing 2-(6-methyl-3-pyridazonyl)-acetic acid to react with acetic anhydride, by refluxing said materials in the presence of pyridine.

9. The method of preparing methyl 1-[2-(6-methyl-3-pyridazonyl)]-ethyl ketone, which comprises causing α-[2-(6-methyl-3-pyridazonyl)]-propionic acid to react with acetic anhydride, by refluxing said materials in the presence of pyridine.

10. The method of preparing 2-(3-pyridazonyl)-acetone, which comprises causing 2-(3-pyridazonyl)-acetic acid to react with acetic anhydride, by refluxing said materials in the presence of pyridine.

No references cited.